(12) United States Patent
Moreton

(10) Patent No.: US 7,420,557 B1
(45) Date of Patent: Sep. 2, 2008

(54) VERTEX PROCESSING WHEN W=0

(75) Inventor: Henry P. Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 272 days.

(21) Appl. No.: 11/212,170

(22) Filed: Aug. 25, 2005

(51) Int. Cl.
*G06T 15/10* (2006.01)

(52) U.S. Cl. .................. 345/427; 382/104; 708/207

(58) Field of Classification Search ................. 345/420, 345/427, 561, 643; 382/104, 291; 708/207
See application file for complete search history.

(56) References Cited

U.S. PATENT DOCUMENTS

| | | | |
|---|---|---|---|
| 4,885,703 A | 12/1989 | Deering | |
| 5,003,497 A | 3/1991 | Priem | |
| 5,357,599 A | 10/1994 | Luken | |
| 6,137,497 A | 10/2000 | Strunk et al. | |
| 6,169,554 B1 | 1/2001 | Deering | |
| 6,304,265 B1 | 10/2001 | Harris et al. | |
| 6,353,439 B1 * | 3/2002 | Lindholm et al. | 345/561 |
| 6,930,684 B2 | 8/2005 | Tjew | |
| 2004/0090437 A1 * | 5/2004 | Uesaki et al. | 345/420 |
| 2005/0190183 A1 * | 9/2005 | Barone et al. | 345/427 |
| 2005/0231533 A1 * | 10/2005 | Chen | 345/643 |
| 2005/0275663 A1 | 12/2005 | Kokojima et al. | |

OTHER PUBLICATIONS

Sutherland, Ivan E., and Gary W. Hodgman, "Reentrant Polygon Clipping," Communications of the ACM, vol. 17, No. 1, pp. 32-42, Jan. 1974.

Olano, Marc, and Trey Greer, "Triangle Scan Conversion Using 2D Homogeneous Coordinates," Proceedings of the 1997 SIGGRAPH/Eurographics Workshop on Graphics Hardware (Los Angeles, CA Aug. 2-4, 1997) ACM SIGGRAPH, New York, 1995.

Blinn, et al. "Clipping Using Homogeneous Coordinates", 1978, ACM SIGGRAPH Computer Graphics, vol. 12, pp. 245-251.

Blinn, James F. "A Trip Down the graphics Pipeline: The Homogeneous Perspective Transform", May 1993. IEEE, pp. 75-80.

Schneider, et al, "Efficient Polygon Clipping for an SIMD graphics Pipeline", 1998. IEEE Transaction on Visualization and Computer Graphics, vol. 4, pp. 272-285.

Joy, Ken, "On-Line Computer Graphics Notes Clipping", Computer Science Department University of California, Davis, Jul. 27, 1999. pp. 1-16.

* cited by examiner

*Primary Examiner*—Phu K. Nguyen
*Assistant Examiner*—Joseph Barnes
(74) *Attorney, Agent, or Firm*—Patterson & Sheridan, LLP

(57) ABSTRACT

Vertices defining a graphics primitive may be processed in homogeneous space and projected into normalized device coordinate space by dividing each coordinate of a vertex by w. When the w coordinate for a vertex is equal to zero, the projected coordinates are set equal to the homogeneous coordinate values. During a viewport transform operation, only the viewport scale is applied rather than applying the viewport scale and viewport bias to produce the vertex in device coordinate space (screen space). Furthermore, when an edge slope is computed for a vertex with a w coordinate equal to zero, the slope is set equal to the vertex in device coordinate space rather than the difference of the two vertices defining the edge. Therefore, a vertex at infinity is correctly positioned avoiding the introduction of visual artifacts.

23 Claims, 7 Drawing Sheets

PRIOR ART

VERTEX PROCESSING WHEN W=0

BACKGROUND OF THE INVENTION

1. Field of the Invention

Embodiments of the present invention generally relate to computer graphics, and more particularly to processing vertices with a w coordinate of 0.

2. Description of the Related Art

Conventional graphics processors are exemplified by systems and methods developed to process graphics primitives defined by vertices that are represented in homogeneous coordinates. Vertices in object space, represented by coordinates (X,Y,Z) are converted into homogeneous space by applying a projection transform, resulting in a vertex represented by coordinates $(x_h,y_h,z_h,w)$. A perspective transform is applied to simulate a scene observed from a specific position and viewed in a specific direction. The graphics primitives are clipped to a viewing frustum in homogeneous space. Clipping is easier to perform and has better precision characteristics when it is performed in homogeneous space.

FIG. 1 illustrates a graphics primitive 100 in homogeneous space with a viewpoint, eye 120 defining a viewing region 110. Graphics primitives and portions of graphics primitives lying outside of the viewing region 110 will not be visible in an image produced from eye 120's perspective since they will be clipped by one or more of the six faces of the viewing frustum. A w>0 region lies in front (to the right in FIG. 1) of eye 120 and a w<0 region lies behind (to the left) of eye 120. A vertex 101 has a w coordinate value of zero.

After the vertices have been processed in homogeneous space they are projected into non-homogeneous space, normalized device coordinate space, by dividing each vertex coordinate by w, to produce projected coordinates $(x_n,y_n,z_n)$ ranging in value from −1 to 1, inclusive. When a vertex has a w coordinate of zero, division by w results in a singularity, producing an infinite vertex that may cause a visual artifact.

Accordingly, there is a desire to process vertices with a w coordinate equal to zero in a robust manner that does not introduce visual artifacts.

SUMMARY OF THE INVENTION

The current invention involves new systems and methods for processing vertices with a w coordinate equal to zero. W coordinates that are equal to zero may occur in clipless graphics systems (systems that do not clip to the viewing frustum) and graphics systems that clip to the w=0 plane. Vertices may be processed in homogeneous space and projected into normalized device coordinate space by dividing each coordinate of a vertex by w. When the w coordinate for a vertex is equal to zero, the projected coordinate is set equal to the homogeneous coordinate value and is treated as a direction rather than a position in subsequent calculations. During a viewport transform operation, only the viewport scale is applied rather than applying the viewport scale and viewport bias to produce the vertex in device coordinate space (screen space). Furthermore, when an edge slope is computed for a vertex with a w coordinate equal to zero, the slope is set equal to the vertex rather than the difference of the two vertices defining the edge because the vertex represents a direction rather than a position.

Various embodiments of a method of the invention for processing a vertex in homogeneous space with a w coordinate of zero, include bypassing a projection operation to convert the vertex in homogeneous space into a vertex in normalized device coordinate space, setting the w coordinate of the vertex in normalized device coordinate space to one, applying a viewport scale to the vertex in normalized device coordinate space to produce a vertex in device coordinate space, bypassing an addition of a viewport bias operation, and outputting the vertex in device coordinate space.

Various embodiments of a computer-readable medium containing a program which, when executed by a processor, performs a process of the invention for processing a vertex in homogeneous space with a w coordinate of zero. The process includes bypassing a projection operation to convert the vertex in homogeneous space into a vertex in normalized device coordinate space, setting the w coordinate of the vertex in normalized device coordinate space to one, applying a viewport scale to the vertex in normalized device coordinate space to produce a vertex in device coordinate space, bypassing an addition of a viewport bias operation, and outputting the vertex as a direction in device coordinate space.

Various embodiments of the invention include a graphics processing system for processing a vertex in homogeneous space with a w coordinate of zero. The system includes a projection unit configured to divide the coordinates of a vertex with a non-zero w coordinate by w to produce a vertex in normalized device coordinate space and output the vertex with the w coordinate of zero as an infinite vertex in normalized device coordinate space.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, wellknown features have not been described in order to avoid obscuring the present invention.

A vertex program may be used to configure a graphics processor to process vertices defining a graphics primitive in homogeneous space and project the vertices into normalized device coordinate space by dividing each coordinate of a vertex by w. When the w coordinate for a vertex is equal to zero, the vertex is an infinite vertex, positioned at infinity in device coordinate space. Infinite vertices are used to represent stencil shadow volumes and control points for a rational polynomial in the Bezier form, for example control points that define a semicircle. Infinite vertices may also occur naturally when representing polynomial surfaces or when a portion of a graphics primitive is behind the eye and the edge of the graphics primitive crosses the eye plane, passing through infinity. Infinite vertices may be created when graphics primitives are clipped to the w=0 plane.

When a vertex has a w coordinate equal to zero, each of the projected coordinates for the vertex, $x_n$, $y_n$, and $z_n$, is set equal to the homogeneous coordinate value and during a viewport transform operation, only the viewport scale is applied rather than applying the viewport scale and viewport bias to produce the vertex in device coordinate space (screen space). Furthermore, when an edge slope is computed for a vertex with a w coordinate equal to zero, the slope is set equal to the vertex in device coordinate space rather than the difference of the two vertices defining the edge. Therefore, infinite vertices are not incorrectly positioned within the viewing frustum, and visual artifacts are avoided. Incorrect positioning results when a w of zero is approximated by a small value to eliminate the creation of infinite vertices caused by dividing by zero. Specifically, when a homogeneous vertex coordinate that is equal to the small value is scaled by the small value to produce the vertex coordinate in normalized device coordinate space, e.g. $x_n=x_h/w$, the result is 1.0. Therefore, a coordinate that should be infinite is computed as 1.0 and may incorrectly be positioned within the viewing region causing a visual artifact.

Figure 1:
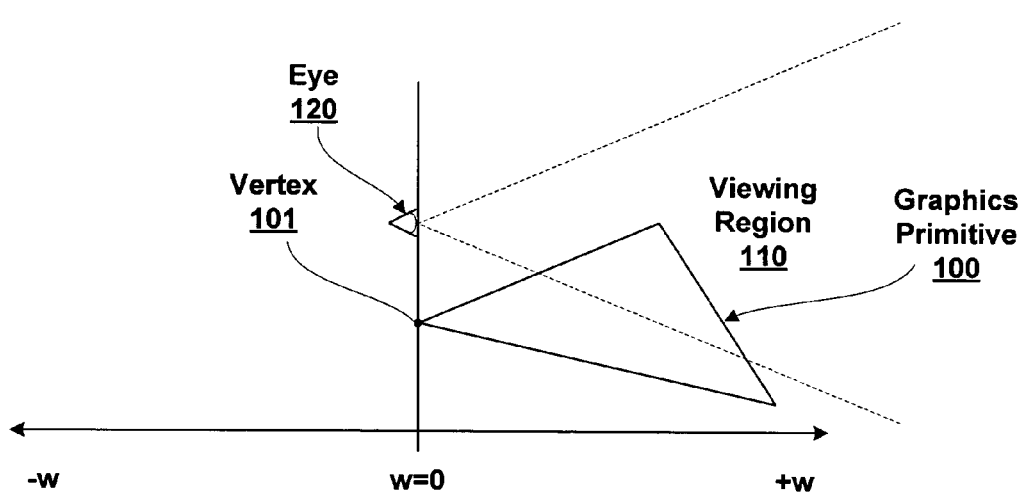
FIG. 1 illustrates a prior art graphics primitive that includes a vertex with a w coordinate that is equal to 0.
Figure 2:
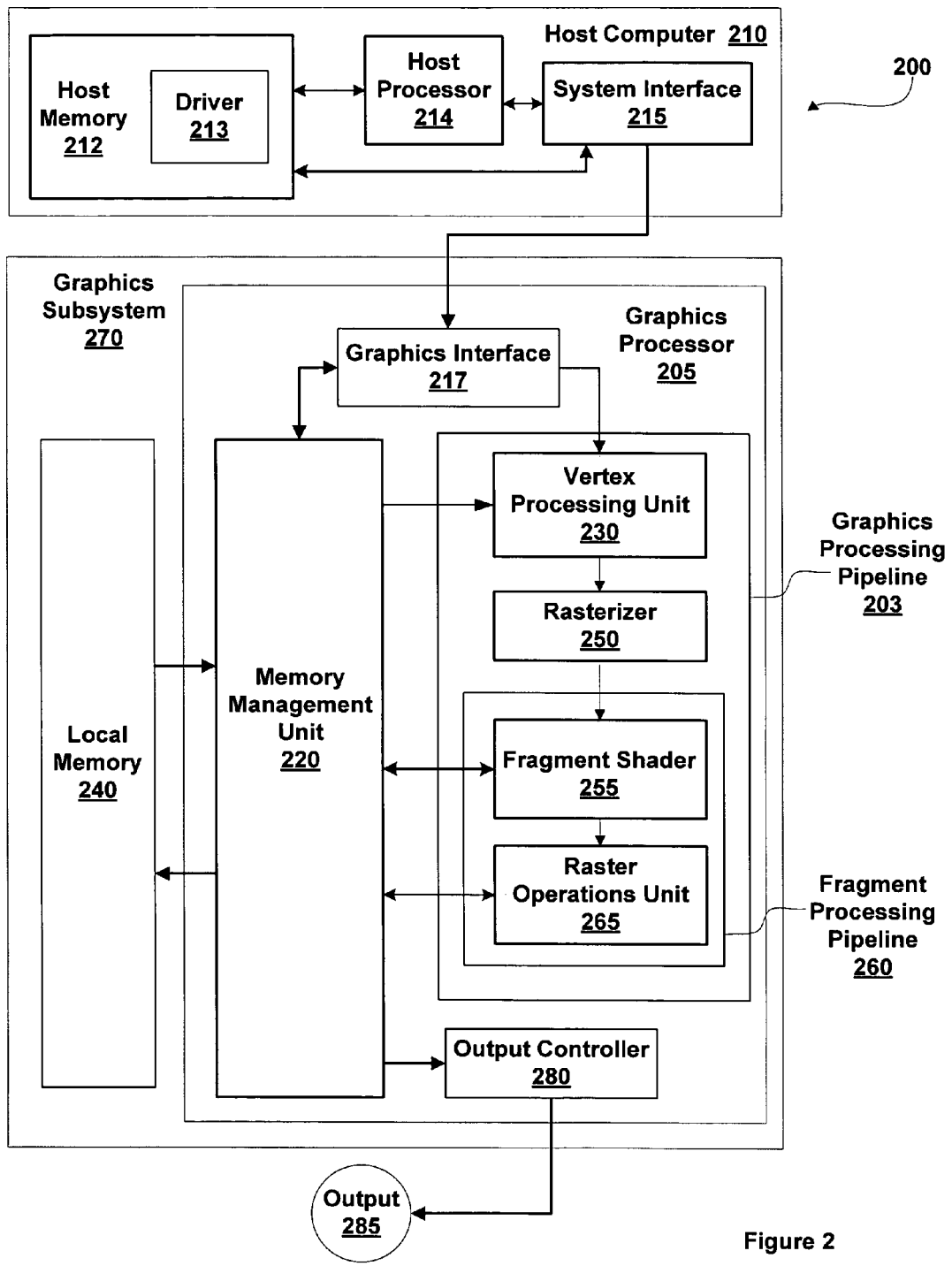
FIG. 2 is a block diagram of an exemplary embodiment of a respective computer system, including a host computer and a graphics subsystem, in accordance with one or more aspects of the present invention.

FIG. 2 is a block diagram of an exemplary embodiment of a respective computer system, including a host computer 210 and a graphics subsystem 270, in accordance with one or more aspects of the present invention. Computing system 200 may be a desktop computer, server, laptop computer, palm-sized computer, tablet computer, game console, portable wireless terminal such as a PDA or cellular telephone, computer based simulator, or the like. Host computer 210 includes host processor 214 that may include a system memory controller to interface directly to host memory 212 or may communicate with host memory 212 through a system interface 215. System interface 215 may be an I/O (input/output) interface or a bridge device including the system memory controller to interface directly to host memory 212. An example of system interface 215 known in the art includes Intel® Northbridge.

Vertex and shader program instructions for execution by a programmable graphics processor 205 may be stored in host memory 212. A graphics device driver, driver 213, interfaces between processes executed by host processor 214, such as application programs and shader programs, and a programmable graphics processor 205, translating program instructions as needed for execution by programmable graphics processor 205.

Graphics subsystem 270 includes a local memory 240 and programmable graphics processor 205. Host computer 210 communicates with graphics subsystem 270 via system interface 215 and a graphics interface 217 within programmable graphics processor 205. Data, program instructions, and commands received at graphics interface 217 can be passed to a graphics processing pipeline 203 or written to a local memory 240 through memory management unit 220. Programmable graphics processor 205 uses memory to store graphics data, including texture maps, and program instructions, where graphics data is any data that is input to or output from computation units within programmable graphics processor 205. Graphics memory is any memory used to store graphics data or program instructions to be executed by programmable graphics processor 205. Graphics memory can include portions of host memory 212, local memory 240 directly coupled to programmable graphics processor 205, storage resources coupled to the computation units within programmable graphics processor 205, and the like. Storage resources can include register files, caches, FIFOs (first in first out memories), and the like.

In addition to Interface 217, programmable graphics processor 205 includes a graphics processing pipeline 203, a memory controller 220 and an output controller 280. Data and program instructions received at interface 217 can be passed to a vertex processing unit 230 within graphics processing pipeline 203 or written to local memory 240 through memory controller 220. In addition to communicating with local memory 240, and interface 217, memory controller 220 also communicates with graphics processing pipeline 203 and output controller 280 through read and write interfaces in graphics processing pipeline 203 and a read interface in output controller 280.

Within graphics processing pipeline 203, programmable vertex processing unit 230 and a programmable graphics fragment processing pipeline, fragment processing pipeline 260, perform a variety of computational functions. Some of these functions are table lookup, scalar and vector addition, multiplication, division, coordinate-system mapping, calculation of vector normals, tessellation, calculation of derivatives, interpolation, filtering, and the like. Vertex processing unit 230 and fragment processing pipeline 260 are optionally configured such that data processing operations are performed in multiple passes through graphics processing pipeline 203 or in multiple passes through fragment processing pipeline 260. Each pass through programmable graphics processor 205, graphics processing pipeline 203 or fragment processing pipeline 260 concludes with optional processing by a raster operations unit 265.

Vertex programs are sequences of vertex program instructions compiled by host processor 214 for execution within vertex processing unit 230 and rasterizer 250. Shader programs are sequences of shader program instructions compiled by host processor 214 for execution within fragment processing pipeline 260. Vertex processing unit 230 receives a stream of program instructions (vertex program instructions) and data from interface 217 or memory controller 220, and performs vector floating-point operations or other processing operations using the data. The program instructions configure subunits within vertex processing unit 230, rasterizer 250 and fragment processing pipeline 260. The program instructions and data are stored in graphics memory, e.g., portions of host memory 212, local memory 240, or storage resources within programmable graphics processor 205.

Data processed by vertex processing unit 230 and program instructions are passed from vertex processing unit 230 to a rasterizer 250. Rasterizer 250 is a sampling unit that processes primitives, e.g. triangles, quadrilaterals, polygons, or the like, including clipped graphics primitives, and generates sub-primitive data, such as fragment data, including parameters associated with fragments (texture identifiers, texture coordinates, and the like). Rasterizer 250 converts the primitives into sub-primitive data by performing scan conversion on the data processed by vertex processing unit 230. Rasterizer 250 outputs fragment data and shader program instructions to fragment processing pipeline 260.

The shader programs configure the fragment processing pipeline 260 to process fragment data. Fragment shader 255 is optionally configured by shader program instructions such that fragment data processing operations are performed in multiple passes within fragment shader 255. Fragment shader 255 may be configured to perform anisotropic or isotropic texture mapping and produce filtered texels. The fragment data and filtered texels are processed by fragment shader 255 to produce shaded fragment data.

Fragment shader 255 outputs the shaded fragment data, e.g., color and depth, and codewords generated from shader program instructions to raster operations unit 265. Raster operations unit 265 includes a read interface and a write interface to memory controller 220 through which raster operations unit 265 accesses data stored in local memory 240 or host memory 212. Raster operations unit 265 optionally performs near and far plane clipping and raster operations, such as stencil, z test, blending, and the like, using the fragment data and pixel data stored in local memory 240 or host memory 212 at a pixel position (image location specified by x,y display coordinates) associated with the processed fragment data. The output data from raster operations unit 265 is written back to local memory 240 or host memory 212 at the pixel position associated with the output data and the results, e.g., image data are saved in graphics memory.

When processing is completed, an output 285 of graphics subsystem 270 is provided using output controller 280. Alternatively, host processor 214 reads the image stored in local memory 240 through memory controller 220, interface 217 and system interface 215. Output controller 280 is optionally configured by opcodes to deliver data to a display device, network, electronic control system, other computing system 200, other graphics subsystem 270, or the like.

Figure 3:
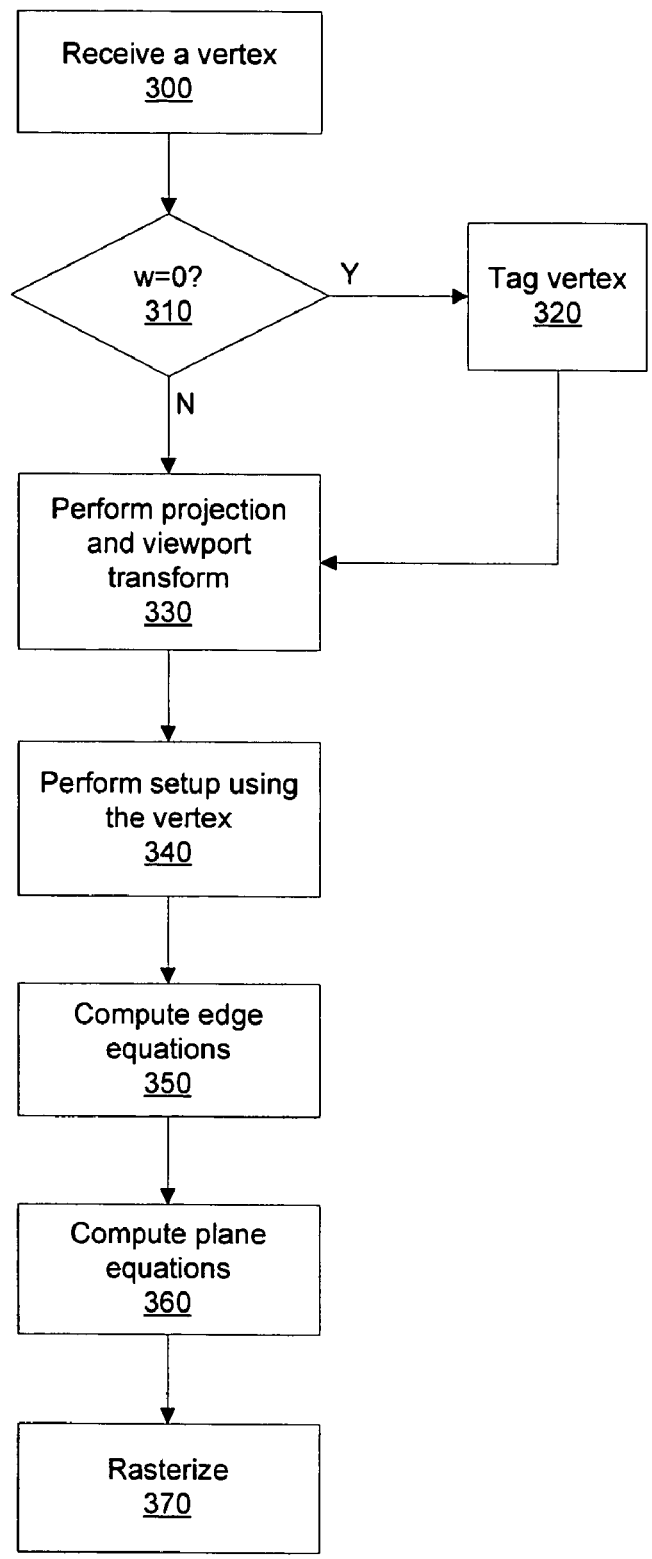
FIG. 3 illustrates an embodiment of a method for processing a vertex with a w coordinate of zero in accordance with one or more aspects of the present invention.

FIG. 3 illustrates an embodiment of a method for processing a vertex with a w coordinate of zero in accordance with one or more aspects of the present invention. As previously described, a vertex may have a w coordinate that is equal to zero as a result of clipping a graphics primitive to a w=0 plane or when the graphics primitive has not been clipped. In step 300 a vertex defining a graphics primitive is received by vertex processing unit 230 or a sub-unit within vertex processing unit 230. The vertex is represented by coordinates in homogeneous space, such as x, y, z, and w. The vertex may have been processed within vertex processing unit 230 using custom transform and lighting operations specified by a vertex program to produce the vertex in homogeneous space. The vertex received in step 300 may also define a clipped graphics primitive resulting from a clipping a graphics primitive by one or more clipping planes. In step 310 vertex processing unit 230 determines if the w coordinate of the vertex is equal to zero, and, if so, in step 320 the vertex is tagged, identifying it as an infinite vertex, and the method proceeds to step 330. In some embodiments of the present invention, w is treated as zero when it is smaller than a threshold value even though it is not equal to zero. If, in step 310 vertex processing unit 230 determines that the w coordinate of the vertex is not equal to zero (or smaller than a threshold value), then the method proceeds directly to step 330.

Figure 6A:
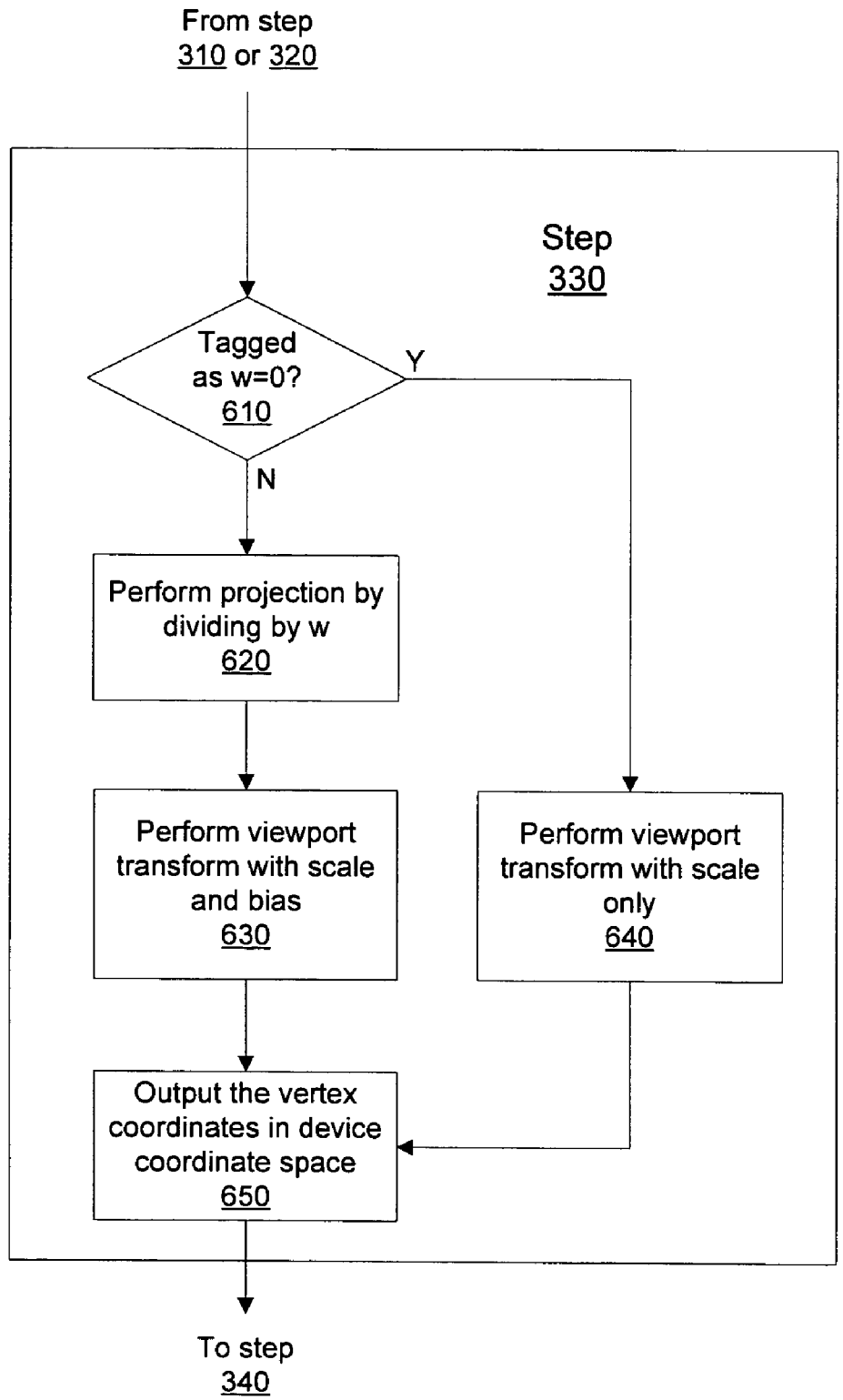
FIG. 6A illustrates an embodiment of a method for performing step 330 of the method shown in FIG. 3 in accordance with one or more aspects of the present invention.

In step 330 vertex processing unit 230 projects the vertex in homogeneous space into normalized device coordinate space and performs a viewport transform operation on the projected vertex, as described in conjunction with FIG. 6A, to produce a vertex in device coordinate space. In step 340 vertex processing unit 230 performs setup to compute an edge slope for rasterization using the vertex in device coordinate space, as described in conjunction with FIG. 6B. In step 350 edge equations for a graphics primitive are computed using the edge slope. In step 360 graphics primitive plane equation coefficients are computed using the edge slope. In step 370 the graphics primitive is rasterized to produce fragments corresponding to pixels covered by at least a portion of the graphics primitive.

Figure 4:
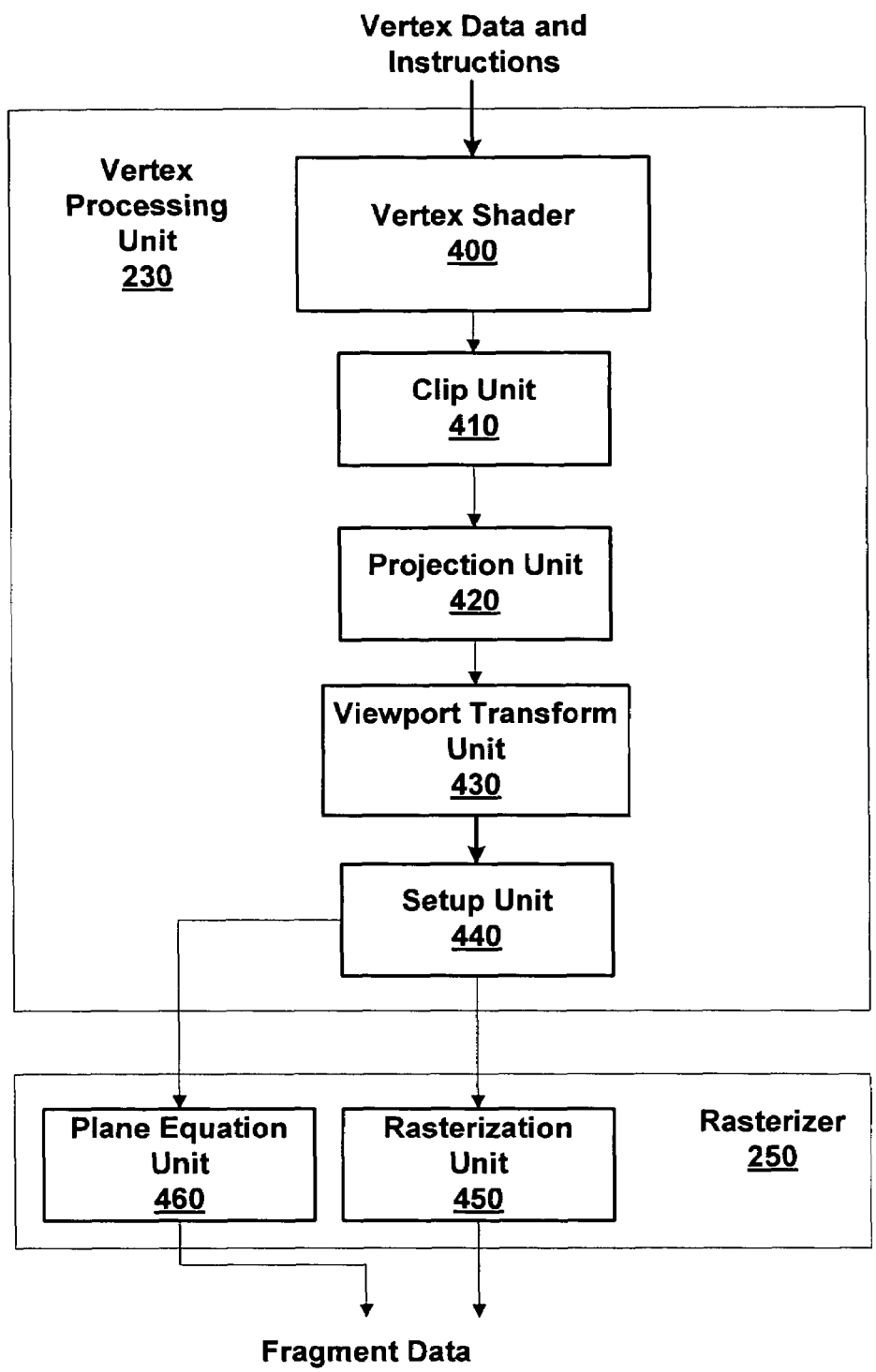
FIG. 4 is a block diagram of an exemplary embodiment of the vertex processing unit from FIG. 2 in accordance with one or more aspects of the present invention.

FIG. 4 is a block diagram of an exemplary embodiment of vertex processing unit 230 from FIG. 2 in accordance with one or more aspects of the present invention. Vertex processing unit 230 includes a vertex shader 400, clip unit 410, projection unit 420, a viewport transform unit 430, and a setup unit 440. Vertex shader 400 receives the vertex program instructions and graphics primitives and operates on the vertices defining graphics primitives. Specifically, vertex shader 400 may be configured to perform custom transform and lighting operations on vertices including modifying position and other parameters such as color, texture coordinates, specularity, or the like. Vertices may be scaled, rotated, or translated; for example a vertex may be transformed from object space to homogeneous space. A vertex shader program may be used to perform custom transform and lighting operations for complex character animation, environmental effects, procedural deformation, morphing, motion blur, lens effects, two-sided lighting, or the like. Vertex shader 400 outputs processed vertices that define graphics primitives and vertex program instructions to clip unit 420. The processed vertices output by vertex shader 400 may be represented in object space or in homogeneous space.

Clip unit 410 clips graphics primitives defined by vertices in homogeneous space to produce clipped graphics primitives. In some embodiments of the present invention, clip unit 410 converts vertices represented in object space into vertices represented in homogeneous space. Some clipped graphics primitives may not require clipping and are output by clip unit 410 unmodified, while other graphics primitives are clipped and new vertices are produced.

Projection unit 420 receives (clipped and unclipped) graphics primitives from clip unit 410 and projects the vertices defining the clipped graphics primitives down onto the w=1 plane toward the origin (w=0 in homogeneous space). When a vertex has a w coordinate that is not equal to zero, projection unit 420 divides the $x_h$, $y_h$, and $z_h$ homogeneous coordinates by w to produce coordinates ($x_h/w, y_h/w, z_h/w, 1/w$) for each vertex that are represented in normalized device coordinate space, i.e., projection unit 420 produces $x_n$, $y_n$, $z_n$, 1/w coordinates for each vertex. When a vertex has a w coordinate that is equal to zero, projection unit 420 tags the vertex to identify that the vertex is an infinite vertex and the projection operation is not performed. Instead, the homogeneous coordinates $x_h$, $y_h$, and $z_h$ are output as the normalized device coordinates $x_n$, $y_n$, and $z_n$. The w normalized device coordinate for the vertex is set to 1.

Viewport transform unit 430 receives the vertices in normalized device coordinate space from projection unit 420 and may be configured to translate the vertices into device coordinate space (screen space), as described in conjunction with FIG. 6A. Specifically, viewport transform unit 430 may scale the normalized device coordinates for each vertex by a viewport scale and add a viewport offset. When a vertex has a w coordinate that is not equal to zero, i.e., not tagged as an infinite vertex, viewport transform unit 430 scales the normalized device coordinates and adds the viewport offset to each scaled coordinate to produce coordinates in device space. When a vertex has a w coordinate that is equal to zero, i.e., tagged as an infinite vertex, viewport transform unit 430 scales the normalized device coordinates, but does not add the viewport offset to each scaled coordinate to produce coordinates in device space. Because the vertex is at infinity, a finite bias can have no effect, therefore the viewport bias is not applied. Viewport transform unit 430 outputs the device coordinates for vertices defining graphics primitives to setup unit 440.

Figure 6B:
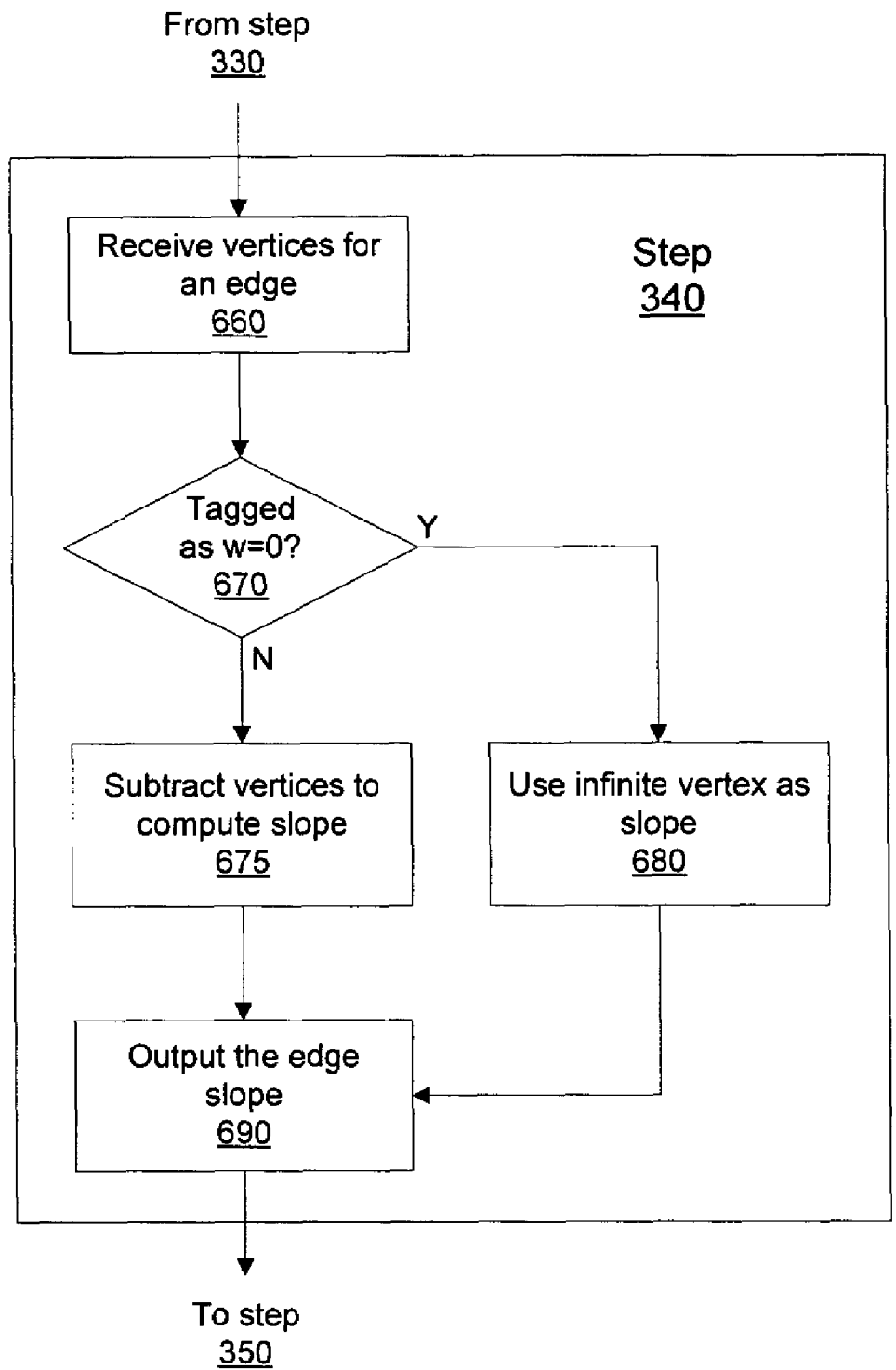
FIG. 6B illustrates an embodiment of a method for performing step 340 of the method shown in FIG. 3 in accordance with one or more aspects of the present invention.

Setup unit 440 receives the coordinates for the vertices defining graphics primitives, represented in device coordinate space, and computes slopes for each graphics primitive edge defined by two vertices, as described in conjunction with FIG. 6B. In some embodiments of the present invention, the coordinates are in a floating point format and setup unit 410 reformats each coordinate to a specific sub-pixel precision, such as 8 bits of sub-pixel precision. Setup unit 440 determines edge equations (line equations) based on the computed slopes and outputs the line equations to a rasterization unit 450 within rasterizer 250. Setup unit 440 outputs the computed slopes to a plane equation unit 460 within rasterizer 250.

Figure 5:
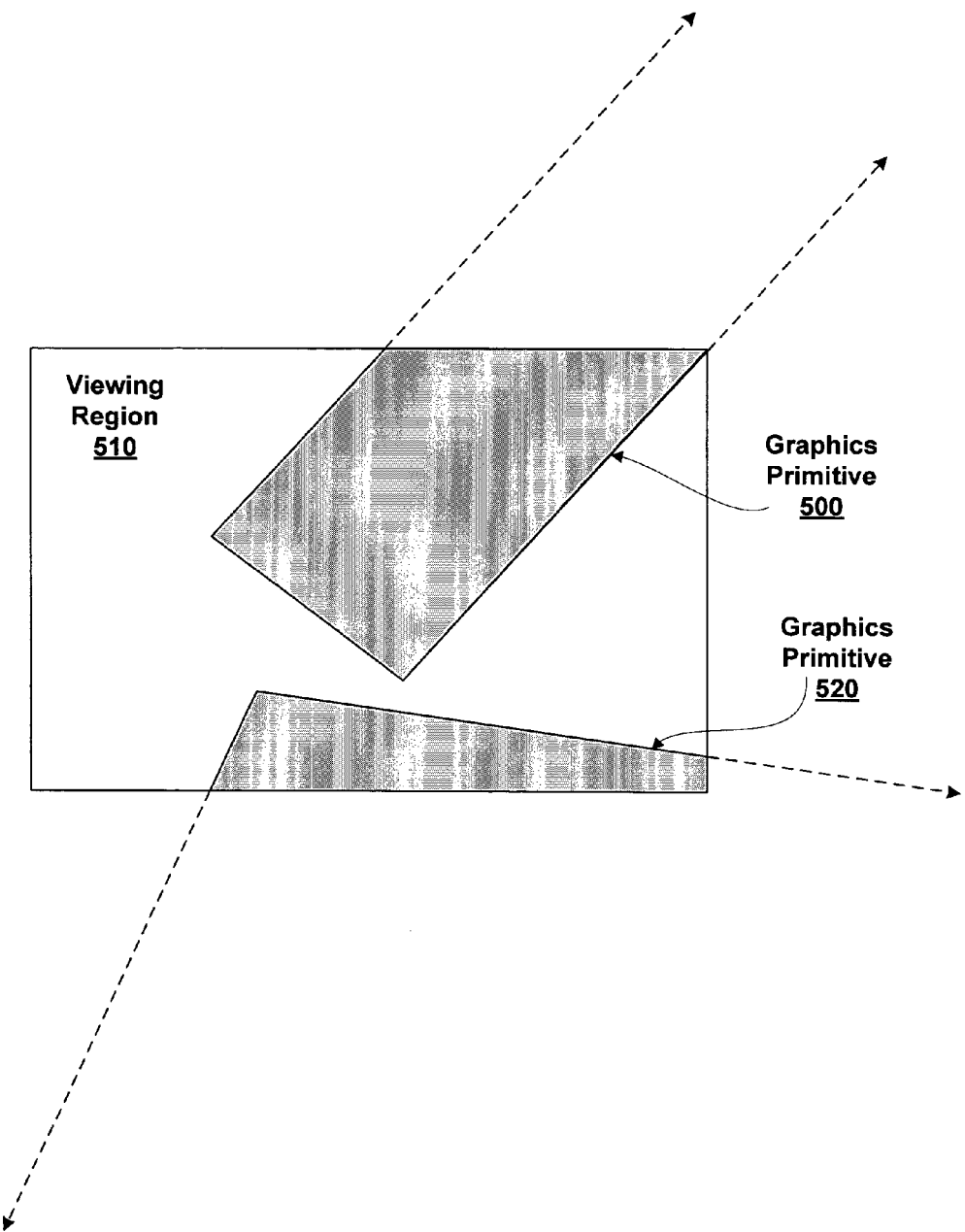
FIG. 5 illustrates graphics primitives that include at least one vertex at infinity resulting from a w coordinate that is equal to 0.

FIG. 5 illustrates graphics primitives that include at least one vertex at infinity resulting from a w coordinate that is considered to be equal to 0, i.e., is equal to zero or less than a threshold value. A graphics primitive 500 and 520 lie within a viewing region 510. Graphics primitive 500 includes one infinite vertex and graphics primitive 520 includes two infinite vertices.

When three vertices define a triangle and one of the vertices is an infinite vertex, such as graphics primitive 500, three line equations are computed, two of which define lines that are parallel and have the infinite vertex as an endpoint. When three vertices define a triangle and two of the vertices are infinite vertexes, such as graphics primitive 520, only two line equations are computed since the third line equation has both endpoints at infinity. Rasterization unit 450 processes the edge equations to produce fragment data and pixel coverage masks for graphics primitive 500 and 520. Plane equation unit 460 processes the slopes to produce plane equation coefficients for use by fragment shader 255 during attribute interpolation and perspective correction.

FIG. 6A illustrates an embodiment of a method for performing step 330 of the method shown in FIG. 3 in accordance with one or more aspects of the present invention. In step 610, projection unit 420 determines if the vertex is tagged as having a w coordinate value of zero, i.e., if the vertex is an infinite vertex. If, in step 610 projection unit 420 or viewport transform unit 430 determines that the vertex is an infinite vertex, then in step 640 viewport transform unit 430 performs a viewport transform to produce vertex coordinates in device coordinate space by scaling the vertex coordinates received from projection unit 420 (homogeneous coordinates output as normalized device space coordinates) by a viewport scale and proceeds to step 650.

If, in step 610 projection unit 420 or viewport transform unit 430 determines that the vertex is not an infinite vertex, then in step 620 projection unit 420 performs a projection operation to produce vertex coordinates in normalized device coordinate space by dividing each vertex coordinate by w and outputs the vertex in normalized device coordinate space to viewport transform unit 430. In step 630 viewport transform unit 430 performs a viewport transform to produce vertex coordinates in device coordinate space by scaling the projected vertex coordinates by a viewport scale and adding a viewport bias to the scaled vertex coordinates. In step 650 viewport transform unit 430 outputs the vertex coordinates in device coordinate space to setup unit 440.

FIG. 6B illustrates an embodiment of a method for performing step 340 of the method shown in FIG. 3 in accordance with one or more aspects of the present invention. In step 660 setup unit 440 receives vertex coordinates in device coordinate space from viewport transform unit 430. Typically a single new vertex may define a new edge along with a previously received vertex and in some cases (strips or fans) a single new vertex may define two or more new edges. In step 670, when two vertices defining an edge of a graphics primitive are available, setup unit 440 determines if at least one of the vertices defining the edge is tagged as an infinite vertex, and, if so, in step 680 the infinite vertex is used as the slope of the edge. In order to compute a plane equation for 1/w, the infinite vertex should have a value at infinity. Therefore, the slope of the edge with an infinite vertex is the homogeneous coordinates, $x_h$, $y_h$, and $z_h$, of the vertex scaled by the viewport scale factor and a w coordinate value of 1 (also scaled by the viewport scale factor) is used as the direction of 1/w.

If, in step 670 setup unit 440 determines that neither of the vertices defining the edge is tagged as an infinite vertex, then in step 675 setup unit 440 subtracts the two vertices defining the edge to produce the slope. In step 690 the edge slope is output by setup unit 440 to plane equation unit 460.

Explicit handling of vertices with a w coordinate equal to zero prevents the introduction of visual artifacts that may be caused by infinite vertices. Vertex computations, such as custom transform and lighting operations may be performed in homogeneous space and vertices with a w coordinate equal to zero are tagged and processed differently than vertices which do not have a w coordinate equal to zero. Tagging and explicit processing of infinite vertices may be used with clipless vertex processing or vertex processing which clips to the w=0 plane and generate vertices with a w coordinate of zero.

While the foregoing is directed to embodiments of the present invention, other and further embodiments of the invention may be devised without departing from the basic scope thereof, and the scope thereof is determined by the claims that follow. For example, in alternative embodiments of the present invention, the method set forth herein may be implemented either partially or entirely in a software program that is executed by host computer 210. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of processing a vertex in homogeneous space with a w coordinate of zero, comprising:
    bypassing a projection operation to convert the vertex in homogeneous space into a vertex in normalized device coordinate space;
    setting the w coordinate of the vertex in normalized device coordinate space to one;
    applying a viewport scale to the vertex in normalized device coordinate space to produce a vertex in device coordinate space;
    bypassing an addition of a viewport bias operation; and
    outputting the vertex in device coordinate space.

2. The method of claim 1, wherein coordinates of the vertex in device coordinate space are represented in a floating point format.

3. The method of claim 1, further comprising tagging the vertex in homogeneous space to indicate that the vertex is an infinite vertex that has a w coordinate of zero.

4. The method of claim 1, further comprising producing the vertex in homogeneous space with a w coordinate of zero as a result of clipping a graphics primitive.

5. The method of claim 1, wherein the vertex in homogeneous space is a control point of a rational polynomial in Bezier form.

6. The method of claim 1, wherein the w coordinate is considered to be zero when the w coordinate is less than a threshold value.

7. The method of claim 1, further comprising defining a slope of a graphics primitive edge as the vertex in device coordinate space, wherein the vertex in device coordinate space and another vertex define endpoints of the edge.

8. The method of claim 1, further comprising defining a slope of an edge with an infinite vertex to be homogeneous coordinates, $x_h$, $y_h$, and $z_h$, of the vertex scaled by the viewport scale such that a w coordinate value of 1 also scaled by the viewport scale is used as the direction of 1/w, wherein the processing of the vertex is used with clipless vertex processing.

9. A computer-readable medium containing a program which, when executed by a processor, performs a process for processing a vertex in homogeneous space with a w coordinate of zero, the process comprising:
bypassing a projection operation to convert the vertex in homogeneous space into a vertex in normalized device coordinate space;
setting the w coordinate of the vertex in normalized device coordinate space to one;
applying a viewport scale to the vertex in normalized device coordinate space to produce a vertex in device coordinate space;
bypassing an addition of a viewport bias operation; and
outputting the vertex in device coordinate space.

10. The computer-readable medium of claim 9, wherein the process further comprises determining a slope of an edge including the vertex in device coordinate space as coordinates of the vertex in device coordinate space.

11. The computer-readable medium of claim 10, wherein the process further comprises using the slope to produce edge equations for a graphics primitive.

12. The computer-readable medium of claim 10, wherein the process further comprises using the slope to produce plane equation coefficients for a graphics primitive.

13. The computer-readable medium of claim 9, wherein the process further comprises tagging the vertex in homogeneous space to indicate that the vertex is an infinite vertex that has a w coordinate of zero or that is less than a threshold value.

14. The computer-readable medium of claim 9, wherein the process further comprises rasterizing a graphics primitive defined by at least the vertex in device coordinate space.

15. The computer-readable medium of claim 9, wherein coordinates of the vertex in device coordinate space are represented in a floating point format.

16. The computer-readable medium of claim 9, wherein the process further comprises defining a slope of an edge with an infinite vertex to be homogeneous coordinates, $x_h$, $y_h$, and $z_h$, of the vertex scaled by the viewport scale such that a w coordinate value of 1 also scaled by the viewport scale is used as the direction of 1/w, wherein the processing of the vertex is used with clipless vertex processing.

17. A system for processing a graphics primitive in homogeneous space, comprising a projection unit configured to divide coordinates of a first vertex of the graphics primitive with a non-zero w coordinate by w to produce a vertex in normalized device coordinate space and output a second vertex of the graphics primitive with a w coordinate of zero as an infinite vertex in normalized device coordinate space.

18. The system of claim 17, further comprising a viewport transform unit configured to scale coordinates of the infinite vertex in normalized device coordinate space to produce an infinite vertex in device coordinate space and to scale coordinates of the vertex in normalized device coordinate space and add a viewport bias to produce a vertex in device coordinate space.

19. The system of claim 18, further comprising a setup unit configured to determine a slope of an edge of the graphics primitive as the infinite vertex in device coordinate space and to determine a slope of another edge of the graphics primitive as a difference between the vertex in device coordinate space and another vertex in device coordinate space with a non-zero w coordinate.

20. The system of claim 18, wherein coordinates of the vertex in device coordinate space are represented in a floating point format.

21. The system of claim 20, further comprising a rasterizer configured to process the infinite vertex in device coordinate space and the vertex in device coordinate space to produce fragment data corresponding to one or more pixels.

22. The system of claim 17, wherein the projection unit is included within a programmable graphics processor, the programmable graphics processor comprising:
a vertex shader configured to perform custom transformation and lighting operations on original vertices of the graphics primitive; and
a clip unit configured to clip the graphics primitive against at least one plane to produce a clipped graphics primitive including the first vertex and the second vertex and provide the first vertex and the second vertex in homogeneous space to the projection unit.

23. The system of claim 18, further comprising defining a slope of an edge with an infinite vertex to be homogeneous coordinates, $x_h$, $y_h$, and $z_h$, of the vertex scaled by the viewport scale such that a w coordinate value of 1 also scaled by the viewport scale is used as the direction of 1/w, wherein the processing of the vertex is used with clipless vertex processing.

* * * * *